United States Patent

[11] 3,527,205

[72] Inventor William C. Jones
 16 W. 328 Walnut Lane, Timber Trails,
 Elmhurst, Illinois 60126
[21] Appl. No. 718,029
[22] Filed April 2, 1968
[45] Patented Sept. 8, 1970

[54] RESPIRATION TESTING APPARATUS
 10 Claims, 4 Drawing Figs.
[52] U.S. Cl. ............................................. 128/2.08
[51] Int. Cl. ............................................... A61b 5/08
[50] Field of Search ........................................ 128/2.07, 2.08

[56] References Cited
 UNITED STATES PATENTS
| | | | |
|---|---|---|---|
| 2,592,694 | 4/1952 | Heidbrink | 128/2.07 |
| 2,707,947 | 5/1955 | Traugott | 128/2.07 |
| 2,709,430 | 5/1955 | Traugott | 128/2.07 |
| 2,792,828 | 5/1957 | Engelder | 128/2.07 |
| 3,129,705 | 4/1964 | Nemec et al. | 128/2.07 |
| 3,467,078 | 9/1969 | Bird et al. | 128/2.08 |

Primary Examiner—Richard A. Gaudet
Assistant Examiner—John B. Mitchell
Attorney—Dawson, Tilton, Fallon and Lungmus ABSTRACT: A device for measuring lung volume and capacity. The device includes a spirometer, a rigid sealed container, an inflatable bag within the container, and a mouthpiece. All of these components are connected to a valve so that the spirometer may be selectively connected to the bag while the mouthpiece is connected to the container, or to the mouthpiece while the bag and container are isolated. The device further includes a gas analyzer for measuring the concentration of a gas in the container.

Patented Sept. 8, 1970

3,527,205

INVENTOR:
WILLIAM C. JONES
BY
Dawson, Tilton, Fallon & Lungmus
ATT'YS

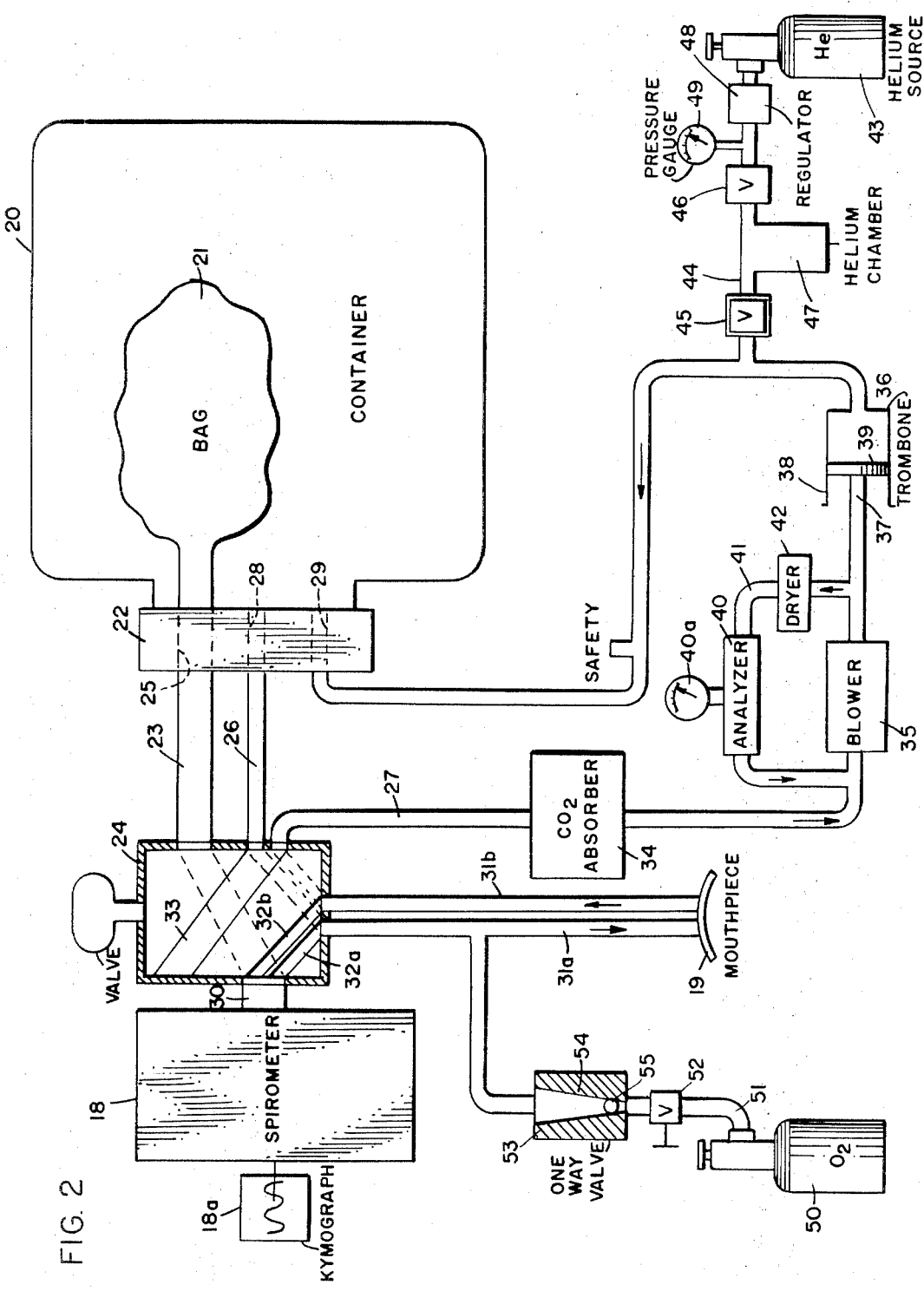

3,527,205

RESPIRATION TESTING APPARATUS

BACKGROUND

In the treatment of patients, especially patients suffering from some respiratory disease such as emphysema, it is often desirable to measure the various lung volumes and lung capacities. Some of these pulmonary functions, such as the vital capacity, inspiratory capacity, and expiratory reserve volume, can be measured directly by such instruments as spirometers. My prior patent entitled "Respiration Testing Apparatus", U.S. Pat. No. 3,086,515, issued April 23, 1963, describes in detail a waterless spirometer that is suitable for such measurements.

However, some of the important pulmonary functions, such as functional residual capacity, residual volume, and total lung capacity were heretofore required to be measured indirectly by various methods. One of the more widely used methods for measuring these values is the so-called closed circuit helium dilution method, which utilizes a conventional spirometer. Each time this method is employed, the volume or "dead space" of the closed spirometer circuit must be determined. The circuit is filled with air at atmospheric pressure, and a measured volume of helium, also under atmospheric pressure, is introduced into the circuit. By measuring the concentration of helium in the spirometer circuit, the volume or dead space of the circuit can be calculated.

After the dead space of the circuit is determined, the circuit is rinsed with air, and a second measured quantity of helium is introduced. The patient breathes the gas of the spirometer circuit first in a normal manner, and then alternately inspires as much gas as he can and expires as much gas as he can so that the directly measurable pulmonary functions may be determined by the spirometer. The patient may then resume normal breathing, and after the helium concentration in the spirometer circuit reaches an equilibrium level, the patient may be switched out of the spirometer circuit. The remaining pulmonary functions or subdivisions of the total lung capacity must then be calculated indirectly.

The functional residual capacity can be calculated if the dead space of the spirometer circuit, the amount of helium that was introduced into the circuit, and the final or equilibrium concentration of helium in the spirometer circuit are all known. However, not only are the calculations heretofore required in using the helium dilution method bothersome and time-consuming, the values obtained are subject to certain inaccuracies. The method operates on the principle that an unknown volume can be measured by connecting that volume to a known volume and observing the difference in concentration of a known quantity of gas when it is confined in the known volume and when it is in equilibrium with the known and unknown volumes. If the known volume is substantially larger than the unknown volume, the difference between the initial and final concentrations of the gas will be small, and these concentrations must therefore be measured very accurately. The known volume in the helium dilution method is the volume of the spirometer circuit, and this volume is usually considerably larger than the volume of gas inspired and expired by a patient when breathing normally.

This helium dilution method further requires that the patient be switched to the spirometer circuit at the end of a normal expiration, or inaccuracies will arise. It has been found difficult to time this switching maneuver precisely.

SUMMARY

Applicant's inventive apparatus directly and accurately measures the functional residual capacity, residual volume, and total lung capacity of the patient without the necessity of calculations. The helium measuring gas is confined within a volume only slightly larger than the volume of gas that a patient expires and inspires during normal breathing, and, therefore, the change in the initial and final concentrations of the helium is substantial and accurately measurable.

DESCRIPTION OF THE DRAWING

FIG. 2 is a schematic diagram of applicant's testing apparatus;

DESCRIPTION OF SPECIFIC EMBODIMENT

Figure 1:
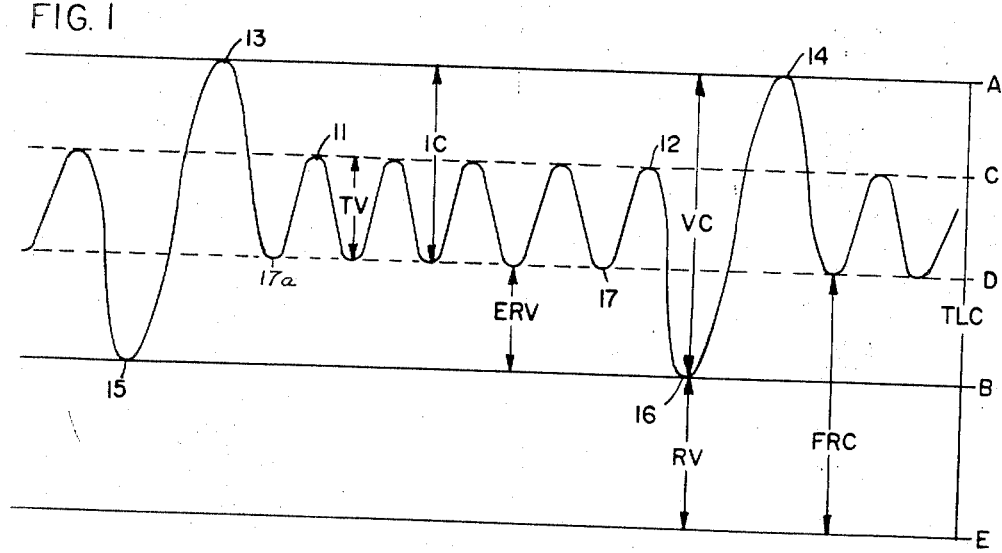
FIG. 1 is an illustration of the graph inscribed by a spirometer showing the various pulmonary subdivisions.

Referring now to FIG. 1, the numeral 10 designates generally the line inscribed by the recording means or kymograph of a spirometer. A detailed description of the recording means of a particular spirometer may be found in my prior United States Patent entitled Respiration Testing Apparatus, U.S. Pat. No. 3,086,515, issued April 23, 1963. The generally sinusoidally shaped portion of line 10 between the minor peaks 11 and 12 was inscribed while the patient was breathing normally, or resting. The major peaks 13 and 14 were inscribed while the patient inspired as much gas as he could, and the major valleys 15 and 16 were inscribed while the patient expired as much gas as he could from his lungs. The straight line A may be drawn to connect the major peaks 13 and 14, and line B connects valleys 15 and 16. The dotted lines C and D enclosed the portion of the graph inscribed during normal breathing.

Many of the pulmonary subdivisions can be measured directly from the kymograph. For example, the vital capacity (VC), which is the maximal amount of gas that can be expelled from the lungs following a maximal inspiration, is measured by the distance between the peaks 13 and 14 and the valleys 15 and 16 or the distance between lines A and B. The tidal volume (TV), which is the volume of gas inspired or expired during each normal respiratory cycle may be measured by the distance between lines C and D. The inspiratory capacity (IC) is the maximal volume that can be inspired from the resting expiratory level and is measured by the distance between solid line A and dotted line D. The expiratory reserve volume (ERV), which is the maximal volume of gas that can be expired from resting expiratory level, is measured by the distance between the dotted line D and the solid line B.

After a patient expels all of the gas from his lungs that he can, there is still some gas remaining in the lungs. The volume of this gas remaining in the lungs at the end of a maximal expiration is called the residual volume (RV), and if the solid line E were taken to represent the point which would be reached on the kymograph if the lungs could be completely evacuated, the residual volume would be the distance between lines B and E.

The total lung capacity (TLC), which is the volume of gas contained in the lungs at the end of a maximal inspiration and which is the sum of the vital capacity and the residual volume, is measured by the distance between the lines A and E. The functional residual capacity (FRC), which is the volume of gas remaining in the lungs at the end of a normal rebreathing exhalation and which is composed of the expiratory reserve and the residual volume, is measured by the distance between the dotted line D and the solid line E.

Since the position of the line E cannot be represented on the kymograph, none of the pulmonary subdivisions of residual volume, functional residual capacity, or total lung capacity can be measured directly. In the past, at least one of these subdivisions had to be determined indirectly by time-consuming and error-prone measurements and calculations, and the other two could then be determined from the kymograph. Applicant's inventive respiratory testing apparatus provides a direct read-out of the functional residual capacity, residual volume, and total lung capacity without the formerly required measuring and calculating steps.

Referring now to FIG. 2, applicant's apparatus is seen to include a spirometer 18 a mouthpiece 19, and a relatively rigid container 20. An inflatable bag 21 is positioned within the container, and the container is sealed by cap 22. Both the bag and container should be made of material having low gas diffusion rates, and it has been found advantageous to use a Mylar bag and a glass or certain plastic containers.

Bag conduit 23 extends between valve 24 and cap 22, and communicates with the interior of bag 21 through opening 25 provided in the container cap. Conduits 26 and 27 extend between valve 24 and cap 22 and communicate with the interior of the container 20 through openings 28 and 29, respectively, provided in the container cap. Spirometer conduit 30 extends between the spirometer 18 and the valve 24 and mouthpiece conduits 31a and 31b extend between the valve 24 and the mouthpiece 19.

Valve 24 is movable from a first position, shown in solid in FIG. 2, to a second position, shown in dotted outline in FIG. 2. In the first valve position, the mouthpiece conduits 31a and 31b are connected to spirometer conduit 30 by means of valve ports 32a and 32b, and bag conduit 23 and conduits 26 and 27 are closed. In the second valve position, spirometer conduit 30 is connected to bag conduit 23 by valve port 33, and mouthpiece conduit 31a is connected to conduit 26 by valve port 32b and mouthpiece conduit 31b is connected to conduit 27 by valve port 32a.

Interposed in conduit 27 is a suitable $CO_2$ absorber 34, such as a canister of soda lime, a conventional gas blower 35, and trombone 36. As can be seen best in FIG. 3, trombone 36 comprises an inner tube 37 slidably received by an outer tube 38. A fluid-tight seal is maintained between the inner and outer tubes of the trombone by gasket 39 positioned around the end of the inner tube. The position of the inner tube within the outer tube may be fixed and the seal therebetween improved by means of a circumferentially extending clamp 39a on the outside of the outer tube which urges the outer tube against the gasket. Both the inner and outer tubes are joined to conduit 27. A conventional helium analyzer 40 communicates with conduit 27 by means of conduit 41, and gas dryer 42 is interposed in conduit 41.

A helium source 43, such as a cylinder of high-pressure helium, is connected to conduit 27 by conduit 44. Solenoid operated valves 45 and 46 are interposed in conduit 44 and helium chamber 47 communicates with conduit 44 between the valves. Pressure regulator 48 and pressure gauge 49 are between the helium source and the valve 46. Pressure regulator 48 is designed to measure relative pressures between the air in the conduit 27 and the container 20, which is at atmospheric pressure, and the helium in helium tank 43. One such suitable regulator is a Bellofram regulator.

If desired, an oxygen source 50 may be connected to mouthpiece conduit 31a by oxygen tube 51, solenoid valve 52 and one-way valve 53. Valve 53 may advantageously be provided by a frusto-conical tube 54 and a ball 55 which seats in the narrowed end of the tube 54 when the pressure in mouthpiece conduit 31a is greater than or equal to the pressure of the oxygen source, which is advantageously about atmospheric pressure.

OPERATION

When the apparatus is first assembled, the volume or "dead space" of the container 20 and its associated conduits 26 and 27 when the valve 24 is in the first position and the bag 21 is fully deflated must be obtained. The dead space constitutes the volume of the container 20 less the volume of the deflated bag 21, plus the volume of gas that can be contained by conduits 26 and 27, valve port 33, $CO_2$ absorber 34, blower 35, analyzer 40, conduit 41, dryer 42, helium measuring chamber 47, and conduit 44.

The dead space is measured in the conventional manner by introducing a measured quantity of helium from the helium source into conduit 27. After the blower 35 uniformly distributes the helium throughout the container 20 and its associated conduits, the concentration of the helium is measured by helium analyzer 40. Since the helium concentration is related to the dead space and the amount of helium introduced by the equation $$C_{He} = \frac{V_{He}}{V_{DS} + V_{He}}$$

in which $C_{He}$ is the concentration of helium, $V_{DS}$ is the volume of the dead space, and $V_{He}$ is the volume of the helium that was introduced. The dead space may then be calculated by the equation $$V_{DS} = \frac{V_{He}}{V_{He}} - V_{He}$$

It is desirable that this dead space be only slightly larger than a normal person's tidal volume, which is normally of the order of 1.7 liters. If the calculated dead space is substantially higher than this figure, the dead space can be reduced by reducing the volume of the container 20 by some convenient method. For example, a liquid plastic which solidifies upon standing may be introduced into the container until the dead space is reduced to the desired value.

After the dead space is accurately determined, the relationship between atmospheric pressure and the pressure in the helium source that is needed to produce a desirable reference initial helium concentration is determined. For example, if a reference initial helium concentration of 15 percent is chosen and the dead space is 1.7 liters, the volume of helium that must be introduced by the helium measuring chamber is calculated to be 300 milliliters at atmospheric pressure. The air in container 20 and the conduits 26 and 27 is at atmospheric pressure, and the helium in the helium source 43 is maintained at a pressure considerably higher than atmospheric pressure. The pressure regulator 48 measures this difference in pressure and may be set to admit the desired amount of helium into the helium chamber 47. Initially the pressure in the helium chamber 47 is equalized with the pressure in conduit 27 by switching open the solenoid operated valve 45, and this valve is then closed. After the helium is introduced into the chamber 47, the valve 46 is closed and the valve 45 opened to introduce the helium into the conduit 27.

Once the regulator 48 is set it will always introduce the desired amount of helium regardless of the atmospheric pressure because the regulator is designed to measure relative pressures. This type of regulator is commercially available, and one such regulator is a Bellofram regulator.

The air in bag 21 is evacuated by manipulating the spirometer, and valve 24 is then moved to its first position as shown in solid in FIG. 2. Valve 46 is then opened to introduce the helium into conduit 27. The patient inserts the mouthpiece 19 into his mouth and breathes through mouthpiece conduits 31a and 31b and spirometer conduit 30 into the spirometer 18. As the patient breathes, the spirometer records the breathing cycle as in FIG. 1. The patient takes a maximal inspiration and a maximal expiration which are recorded as at 14 and 16, respectively, in FIG. 1. The patient then breathes normally, and at the end of a resting expiration as at 17 in FIG. 1 the valve 24 is switched to its second position. The end of a resting expiration or end tidal volume can be observed on the kymograph 18a so that the valve 24 can be switched at precisely the desired point.

When the valve 24 is switched to its second position, the spirometer is connected to the bag 21 and the patient breathes the air and helium contained in the conduits 26 and 27 and the container 20. The blower 35 establishes a gas flow so that the patient inspires the gas from the container through the conduits 26 and 31a and expires into the container through the conduits 31b and 27 in the direction of the arrows. As the patient inspires, the bag 21 expands to replace the volume of gas removed from the container, and as the patient expires the bag deflates. Thus, even though the patient is breathing in a rigidly confined closed system, the inflatable bag permits gas to be withdrawn from and expelled into the system. The bag inflates and deflates by respectively drawing air from and forcing air into the spirometer 18, and the patient's breathing cycle is recorded on the kymograph even though the patient is not breathing directly into the spirometer.

The patient breathes normally until the helium concentration achieves equilibrium throughout the container 20, its associated conduits, and the patient's lungs. The blower 35 facilitates achieving this equilibrium state, and a normal patient may reach equilibrium in about two or three minutes while a patient suffering from a respiratory disease such as emphysema may require as many as seven or more minutes.

While the valve is in the second position, the patient is breathing normally as indicated between the points 17 and 11 in FIG. 1, and it is thus seen that the dead space of the apparatus need not be more than the tidal volume of the patient. The percentage change of the helium concentration from the initial reference level to the final equilibrium concentration will therefore be about 50 percent. Heretofore, helium dilution systems required a dead space much larger than the patient's tidal volume in order to accommodate the maximal inspiration and maximal expiration of the patient. The accuracy of the system was thereby reduced because the greater the dead space is in relation to the tidal volume of the patient, the less percentage change occurs between the initial and final concentrations of helium.

The helium concentration is measured by the helium analyzer 40, and when the concentration reaches a constant level, the helium has reached its equilibrium concentration. The valve 24 is then switched to its first position at an end tidal volume as at 17a, and the patient again takes a maximal inspiration and maximal expiration, which are indicated at 13 and 15 of FIG. 1, respectively.

Since the valve 24 was switched to its first position at the end of a resting expiration, the helium that remained in the patient's lungs at that time was contained in a volume equal to the functional residual capacity of the patient's lungs. The equilibrium helium concentration is thus related to the functional residual capacity, the volume of helium introduced by the helium measuring chamber, and the dead space by the equation $$C_{He} = \frac{V_{He}}{V_{He} + V_{DS} + FRC}$$

in which $C_{He}$ = equilibrium concentration of helium
$V_{He}$ = the volume of helium introduced from the helium measuring chamber.
$V_{DS}$ = the dead space of the apparatus.
FRC = the functional residual capacity of the patient.

It should be noted that the measured dead space should be adjusted by adding the volume of conduits 31a and 31b and valve ports 32a and 32b, which were not connected to the container when the dead space was measured, and by subtracting the volume of valve port 33.

The functional residual capacity may then be calculated from the equation $$FRC = \frac{V_{He}}{V_{He}} - V_{He} - V_{DS}$$

Once applicant's apparatus has been assembled and calibrated, $V_{He}$ and $V_{DS}$ are fixed. For example, as discussed above, the dead space may advantageously be fixed at 1.7 liters, which is approximately the tidal volume of an average person, and the helium measuring gauge 47 may be adjusted to introduce 300 milliliters of helium at atmospheric pressure into the helium measuring chamber. If $V_{He}$ and $V_{DS}$ are fixed, the functional residual capacity is seen to be related solely to the equilibrium concentration of the helium, and the gauge 40a of the helium analyzer can be calibrated to give a direct read out of the functional residual capacity.

It is thus seen that applicant's apparatus improves the accuracy of the measurement of the functional residual capacity by reducing the dead space of the measuring apparatus and eliminates the time-consuming step of calculating the functional residual capacity by giving a direct read out of this value. Applicant's apparatus also eliminates the necessity of recalculating the dead space each time the apparatus is used, even if the operating conditions vary.

Several components of the apparatus may vary the dead space, for example, the amount of soda lime in the $CO_2$ absorber. However, this change in the dead space may be compensated for by adjusting the trombone 36. If the operator desires to increase the amount of soda lime in the $CO_2$ absorber, the dead space will be correspondingly decreased. The inner tube 37 of the trombone may then be moved with respect to the outer tube 38 to increase the length of the conduit 27, thereby increasing the dead space. For example, assume that the apparatus as originally assembled had a dead space of 1.7 liters and that the helium pressure regulator 48 introduced 300 milliliters of helium at atmospheric pressure. When the helium is introduced from the helium measuring chamber, the helium analyzer should indicate an initial concentration of 15 percent helium. If the concentration is not exactly 15 percent helium, it is known that the dead space has varied from its original or reference value of 1.7 liters. The trombone is then adjusted until the helium analyzer indicates a helium concentration of 15 percent. At this time, the dead space will be 1.7 liters. The dead space must be brought back to its reference level before the valve 24 is switched to its second position so that the functional residual capacity will be a function solely of the equilibrium helium concentration.

Once the apparatus has been assembled and calibrated, the dead space need never again be calculated. The dead space can be brought to the calibrated level merely by adjusting the trombone until the helium analyzer indicates the reference helium concentration. For purposes of illustration this has been taken as 15 percent.

The machine will give an accurate and direct read-out of the functional residual capacity without the necessity of calculating the dead space or measuring the amount of helium introduced each time the machine is used. This is true regardless of changes in factors which may effect dead space, such as the amount of soda lime used, and regardless of the altitude at which the apparatus is operated. The pressure regulator 48 automatically compensates for changes in altitude, and the same amount of helium will always be admitted to the helium chamber 47. Changes in dead space can be compensated for by manipulating the trombone to vary the length of the conduit 27 until the helium analyzer indicates the reference concentration of helium.

If it is desired to obtain a direct reading of the residual volume or the total lung capacity rather than the functional residual volume, then the valve 24 is switched back to its first position at the end of a maximal expiration or inspiration rather than at the end of a resting expiration.

While the patient is breathing the gas contained in the container 20 and conduits 26 and 27, he is consuming oxygen. The patient can either be disconnected from the circuit before all of the oxygen is consumed, or he can be supplied with oxygen as he breathes. It has been found that the pulmonary functions can be measured more accurately if oxygen is supplied while the patient breathes, but the patient is seldom supplied with only that amount of oxygen that is consumed. If more or less than this amount is introduced to the system, inaccuracies will arise.

Figure 3:
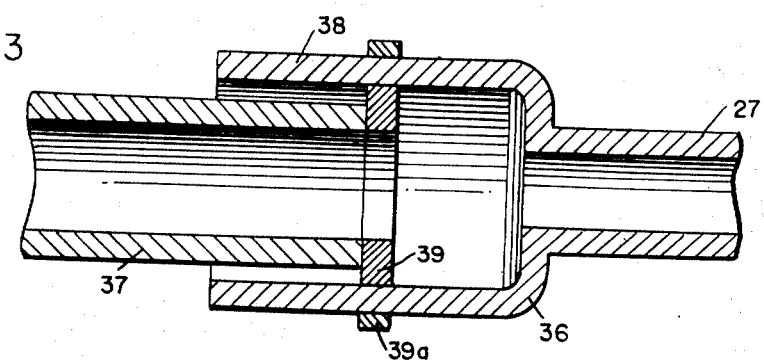
FIG. 3 is an enlarged fragmentary view of a portion of FIG. 2.
Figure 4:
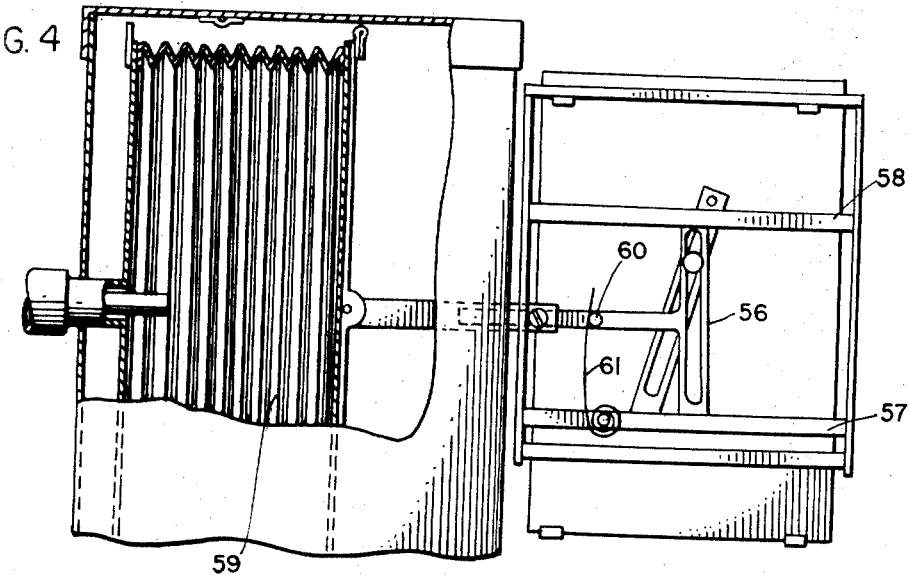
FIG. 4 is a fragmentary side view of a spirometer.

Applicant provides a means for accurately supplying to the patient approximately the same amount of oxygen that is consumed. FIG. 3 illustrates a portion of a waterless spirometer that may be used as a part of the inventive apparatus. A more detailed description of this spirometer may be found in my prior United States Patent entitled Respiration Testing Apparatus, U.S. Pat. No. 3,086,515, issued April 23, 1963. T-shaped member 56 is slidably mounted on tracks 57 and 58 for horizontal movement as the bellows 59 expands and contracts. The bellows contracts to fill bag 21 when the patient inspires and expands to deflate the bag when the patient expires. The T-shaped member 56 is provided with an abutment 60, which is adapted to engage a spirally wound spring 61 carried by the track 57. The spring is positioned so that it is contacted by the abutment just prior to the point of farthest movement of the member 56 and the abutment to the left during a normal inspiration. The bellows 59 is restrained from contracting fully to fill bag 21 and a negative pressure is created in the container 20. Oxygen source 50 which is maintained at atmospheric pressure, then introduces oxygen to the patient through one-way valve 53. The spring is movably mounted so that the point at which it is engaged by the abutment and the amount of oxygen supplied during each breathing cycle can be varied.

Other types of spring means may be used with other types of spirometers. All that is necessary is that the movable air supplying means or bellows of the spirometer be restrained from contracting fully to replace the inspired air so that oxygen will be drawn from an oxygen source.

While in the specific embodiment illustrated, I have described the spirometer being connected to the bag 21 and the mouthpiece connected to the container 20 when the valve is in the second position, these connections may be reversed. That is, the spirometer may connect to the container and the mouthpiece to the bag. The dead space of the apparatus would be measured when the bag is fully inflated to fill the interior of the container, and the patient would be switched into the bag at the beginning of an inspiration. The bag would deflate during inspiration, and the spirometer would fill the space created between the bag and the container. The conduits 26 and 27 would communicate with the bag, and the conduit 23 would communicate with the container.

While in the foregoing specification a detailed description of an embodiment of the invention was set forth for the purpose of explanation, it is to be understood that many of the details hereingiven may be varied considerably by those skilled in the art without departing from the spirit and scope of the invention.

I claim:

1. A respiration testing apparatus including:
   a. spirometer means;
   b. a relatively gas-tight container;
   c. inflatable bag means in said container;
   d. mouthpiece means;
   e. valve means;
   f. means for introducing gas into said container;
   g. gas analyzing means communicating with said container;
   h. first conduit means between said mouthpiece means and said valve means;
   i. second conduit means between said spirometer means and said valve means; and
   j. third conduit means between said container and said valve means,
   said valve being movable between first and second positions, said first conduit means commuciating with said second conduit means and sealed from said third conduit means which said valve is in the first position, said first conduit means communicating with said third conduit means and sealed from said second conduit means when said valve is in the second position.

2. The apparatus of claim 1 including fourth conduit means between said container and said valve, blower means in said fourth conduit means, fifth conduit means between said bag means and said valve, said first conduit means including a first breathing tube and a second breathing tube, said first breathing tube communicating with said third conduit means and said second breathing tube communicating with said fourth conduit means when said valve is in the second position, said fifth conduit means communicating with said second conduit means when said valve is in the second position.

3. The apparatus of claim 2 including means for varying the length of said fourth conduit means.

4. The apparatus of claim 3 in which said length varying means comprises an inner and outer tube interposed in said fourth conduit means, said inner tube being slidably received by said outer tube and maintaining a fluid tight seal therewith.

5. The apparatus of claim 1 including an oxygen source communicating with said mouthpiece, spring means on said spirometer, said spirometer including expanding and contracting means for forcing air from said spirometer, said spring means restraining full contraction of said air forcing means, whereby oxygen is drawn into said mouthpiece to replace oxygen as it is consumed.

6. A respiration testing apparatus including:
   a. a spirometer;
   b. a relatively rigid, fixed volume, sealed container;
   c. an inflatable bag within said container;
   d. a mouthpiece;
   e. a two-position valve, each of said spirometer, container, bag and mouthpiece being connected to said valve by an associated conduit;
   f. means for introducing a predetermined helium-in-air relationship into the container; and
   g. a gas analyzer communicating with said container,
   said valve in one position connecting the spirometer conduit to the mouthpiece conduit and in the other position connecting the spirometer conduit to the bag conduit and the mouthpiece conduit to the container conduit.

7. The apparatus of claim 6 including a second container conduit connecting said container to said valve, said gas analyzer communicating with said second container conduit, blower means in said second container conduit, carbon dioxide absorption means in said second container conduit, a second mouthpiece conduit connecting said mouthpiece to said valve, said valve connecting said second mouthpiece conduit to said second container conduit when said valve is in the other position.

8. The apparatus of claim 7 including an oxygen source connected to one of said mouthpiece conduits through a one-way valve, a spring mounted on said spirometer, said spirometer including bellows means for forcing air from said spirometer to said bag, said spring restraining full contraction of said bellows means, whereby oxygen is drawn from said oxygen source through the mouthpiece conduit to replace oxygen as it is consumed.

9. The apparatus of claim 7 including means for varying the length of said second container conduit, said length varying means including an inner tube and an outer tube, one end of each of said inner and outer tubes being connected to said second container conduit, the other end of said inner tube being slidably received by the other end of said outer tube and maintaining a gas-tight seal therewith.

10. A respiration testing apparatus including:
    a. a spirometer;
    b. a relatively rigid, fixed volume, sealed container;
    c. an inflatable bag within said container;
    d. a mouthpiece;
    e. a two-position valve, each of said spirometer, container, bag and mouthpiece being connected to said valve by an associated conduit;
    f. means for introducing a predetermined helium-in-air relationship into the container; and
    g. a gas analyzer communicating with said container,
    said valve in one position connecting the spirometer conduit to the mouthpiece conduit and sealing the bag and container conduits and in the other position connecting the spirometer conduit to the container conduit and the mouthpiece conduit to the bag conduit.

PO-1050
(5/69)

UNITED STATES PATENT OFFICE
CERTIFICATE OF CORRECTION

Patent No. 3,527,205             Dated September 8, 1970

Inventor(s) William C. Jones

It is certified that error appears in the above-identified patent and that said Letters Patent are hereby corrected as shown below:

In column 7, line 54, "which" should read -- when --.

SIGNED AND
SEALED
DEC 29 1970

(SEAL)
Attest:

Edward M. Fletcher, Jr.
Attesting Officer

WILLIAM E. SCHUYLER, JR.
Commissioner of Patents